Patented July 10, 1951

2,559,628

UNITED STATES PATENT OFFICE 2,559,628

FLUORINE-CONTAINING ALCOHOLS AND PROCESS FOR PREPARING THE SAME

Robert M. Joyce, Jr., Wilmington, Del., assignor to E. I. du Pont de Nemours & Company, Wilmington, Del., a corporation of Delaware No Drawing. Application December 13, 1948, Serial No. 65,063. In Canada April 22, 1944

14 Claims. (Cl. 260—633)

This invention relates to new organic fluorine compounds and to methods for their preparation. More particularly this invention relates to new fluorine-containing alcohols and to processes for preparing them.

This invention is a continuation-in-part of my copending application Serial No. 567,777 filed December 11, 1944, and now abandoned which is a continuation-in-part of application Serial No. 484,300 filed April 23, 1943, and which is now abandoned.

Much work has been directed toward developing a good method for preparing highly fluorinated organic compounds. It has previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

Heretofore, the only practical method for preparing fluorine-containing organic compounds has been to replace chlorine or bromine with fluorine by means of various inorganic reagents, such as hydrogen fluoride, silver fluoride, antimony fluorides, mercuric fluoride and other metallic fluorides. However, such processes involve considerable expense and are very restricted in application.

It is an object of this invention to provide new compositions of matter consisting of fluorine-containing alcohols and methods for their preparation. A further object is to provide fluorine-containing alcohols which have extreme stability and inertness. A still further object is to provide fluorine-containing alcohols possessing many novel and useful properties. Another object is to provide relatively simple and inexpensive processes for obtaining new fluorine-containing alcohols. Other objects will appear hereinafter.

These and other objects and advantages are accomplished by providing new fluorine-containing alcohols having from one to twelve completely halogenated polyfluoroethylene groups per molecule. The new products of this invention are the reaction products of a tetrahaloethylene wherein the four halogen atoms have an atomic weight of less than 40, and at least two of them are fluorine atoms, with an alcohol which contains a non-aromatic carbon atom bearing a hydroxyl group and a hydrogen atom directly attached thereto and in which all of the non-aromatic carbon atoms are saturated, the reaction product having a hydroxyl group and containing from one to twelve of said tetrahaloethylene units. These new fluorine-containing alcohols are represented by the formula

wherein the X substituents are halogen atoms having an atomic weight of less than 40 of which at least half in each $CX_2CX_2$ group are fluorine atoms, $n$ is a positive integer from 1 to 12 and ZOH is the radical of a non-tertiary alcohol which contains a non-aromatic carbon atom directly attached to the hydroxyl group and in which all of the non-aromatic carbon atoms are saturated.

The preferred tetrahaloethylene is tetrafluoroethylene and the new fluorine-containing alcohols resulting therefrom are represented by the formula $H(CF_2CF_2)_nZOH$ where $n$ and ZOH are defined as aforesaid. The preferred class of alcohols are primary and secondary hydrocarbon alcohols, particularly alkanols, and the new fluorine-containing alcohols resulting therefrom are represented by the formula $H(CX_2CX_2)_nROH$ where X and $n$ are defined as aforesaid, R is a divalent hydrocarbon radical, preferably a divalent saturated aliphatic hydrocarbon radical, and ROH is the radical of a non-tertiary alcohol. Thus —ROH is the monovalent radical of a primary or secondary alcohol, that is the monovalent radical of a non-tertiary alcohol. The preferred new fluorine-containing alcohols have the formula $H(CF_2CF_2)_nROH$ where $n$, R and ROH are defined as aforesaid. Particularly preferred fluorine-containing alcohols have the formula $H(CF_2CF_2)_nROH$ where $n$ is a positive integer from 1 to 12, R is a divalent saturated open-chain aliphatic hydrocarbon radical containing from 1 to 6 carbon atoms and ROH is a saturated open-chain aliphatic radical of a monohydric non-tertiary alcohol.

The novel products of this invention can be prepared by heating at a temperature of 50° to 350° C. in the presence of a catalyst a completely halogenated fluoroethylene having the formula $CX_2CX_2$ containing at least two fluorine atoms, the remaining halogen atoms, if any, being chlorine atoms, with an alcohol which is free of non-aromatic unsaturation and in which the carbon atom bearing the hydroxyl group has directly attached thereto a hydrogen atom, i. e., a primary or secondary alcohol.

A preferred form of the invention may be carried out by heating tetrafluoroethylene with a primary or secondary alcohol which contains from one to six carbon atoms and which is free from non-aromatic unsaturation, preferably in a closed system and in the presence of a peroxy or azo catalyst. There are thus obtained saturated polyfluoro organic compounds which contain alcoholic hydroxyl groups and which contain one or more tetrafluoroethylene units per molecule of alcohol.

By the expression "organic compound free from non-aromatic unsaturation," as used herein and in the appended claims, is meant an organic compound which is free from carbon to carbon multiple bonds, i. e., a double or triple bond linking two adjacent carbon atoms, other than those which are present in an aromatic ring, e. g., a benzene nucleus.

The method for carrying out the reactions varies to some extent with different alcohols, but the usual procedure comprises placing the reactants in a stainless steel or silver-lined high pressure reaction vessel and then closing and heating to the desired reaction temperature while mechanically agitating the reaction vessel for the reaction period.

In order to prepare the low molecular weight products which are characteristic of this invention, it is usually desirable to carry out the reaction under pressure at elevated temperatures. The temperature at which the reaction is effected may be varied over a wide range, depending largely upon the nature of the reactants, the catalyst, the results desired and other conditions of the reaction. However, the temperature should be below that at which decomposition or pyrolysis of either the reactants or products occurs. With peroxy catalysts, no appreciable reaction is obtained below 75° C. and it is usually necessary to heat the reaction mixture to about 100° C. or higher in order to obtain a substantial reaction in a reasonable time. The preferred temperature range with peroxy catalysts is 100° to 250° C. but temperatures high as 350° C. are sometimes desirable. However, with azo catalysts temperatures as low as 50° C. may be employed, suitable temperatures being 60° to 200° C.

A series of products can be obtained which vary from liquids to solids depending upon the number of fluoroethylene units per molecule. The products are highly fluorinated saturated alcohols containing one or more units of the fluoroethylene per molecule. The products vary from liquids which are compatible with the common organic solvents to solids which are soluble in selected solvents, such as acetic acid.

The invention is further illustrated by the following examples in which proportions are in parts by weight unless otherwise specified.

Example I

One hundred and twenty parts of methanol and 1.5 parts of diethyl peroxide were charged into a stainless steel autoclave. The autoclave was cooled, evacuated and 50 parts of tetrafluoroethylene added. The autoclave was closed and heated at 175° C. for 8 hours. The reaction mixture was steam distilled to yield 6.9 parts of steam-volatile liquid products insoluble in and heavier than water, 2.5 parts of steam-volatile solid which contained an average of about five tetrafluoroethylene units/methanol unit, and 17.4 parts of nonsteam-volatile solid wherein the number of tetrafluoroethylene units/methanol unit ranged up to about twelve (M. P. about 279° C.). The liquid products were fractionally distilled through an efficient column to give fractions corresponding to the 1:1 (C$_2$F$_4$/CH$_3$OH) and other low molecular weight (C$_2$F$_4$)$_n$/CH$_3$OH) reaction products. The liquid products were found to react with sodium giving off hydrogen and to react with acetic anhydride yielding esters. A fraction boiling at 170–171° C. was found to have the following analysis:

|  | F Per Cent | C Per Cent | H Per Cent |
|---|---|---|---|
| Found | 63.90 | 24.18 | 1.26 |
| Calculated for H(CF$_2$CF$_2$)$_2$CH$_2$OH | 65.4 | 25.85 | 1.72 |
| Calculated for H(CF$_2$CF$_2$)$_3$CH$_2$OH | 68.6 | 25.30 | 1.20 |

Esterification of a low molecular weight liquid reaction product obtained having a boiling range of 145–170° C. with acetic anhydride gave the acetate

|  | F Per Cent | Molecular Weight |
|---|---|---|
| Found | 54.51 | 278 |
| Calculated for H(CF$_2$CF$_2$)$_2$—CH$_2$—O—C—CH$_3$ (‖O) | 55.4 | 274 |

Example II

One hundred and twenty parts of isopropanol, 1.5 parts of benzoyl peroxide and 50 parts of tetrafluoroethylene were heated 9.5 hours at 110° C. under pressure. Steam distillation of the reaction mixture yielded 18 parts of water-insoluble liquid which was heavier than water and 0.5 part of nonsteam-volatile waxy pellets (M. P. about 250° C.). Fractionation of the volatile liquid products yielded a series of liquids which increased in percentage of fluorine with increase in boiling point from the 1:1 product boiling around 120° C. to products boiling above 200° C. at atmospheric pressure which contained more than 3 tetrafluoroethylene units to one isopropanol unit. These liquid products react with metallic sodium giving off hydrogen and can be esterified by reacting with acetic anhydride to yield esters.

| Boiling Point, °C. | Analysis, F Per Cent | Calculated, F Per Cent | Ratio C$_2$F$_4$/C$_3$H$_8$O |
|---|---|---|---|
| 117–119 | 45.0 | 47.5 | 1/1 |
| 147–152 | 54.7 | 58.4 | 2/1 |
| 186–189 | 62.2 | 63.3 | 3/1 |

A similar reaction was obtained using secondary butanol instead of isopropanol.

Example III

A mixture of 150 parts of methanol and 2 parts of 1,1'-azodicyclohexanecarbonitrile was placed in a high pressure reactor having a capacity of 400 parts by volume under an atmosphere of nitrogen. The reactor was closed, cooled and 110 parts of tetrafluoroethylene was distilled in through a valve. The reactor was then agitated and heated at 125° C. for 10 hours under autogenous pressure. The crude reaction product was subjected to steam distillation, whereby 20 parts of steam-volatile mixed liquid and solid distilled and a residue of 18 parts remained. The steam-volatile portion was separated into liquid and solid fractions and the liquid fraction was dried and distilled, yielding 10 parts boiling in the range 140–200° C. and leaving a residue of 7 parts which solidified on cooling. The liquid fraction was a mixture of compounds $$H(CF_2CF_2)_nCH_2OH$$

in which $n$ is 2 and 3 and the solid residue was a mixture of similar compounds in which $n$ has the values 4 and 5. The steam-volatile solid fraction was recrystallized from chloroform yielding 1.5 parts of the compound $H(CF_2CF_2)_6CH_2OH$, melting at 125–129° C.

Example IV

A mixture of 150 parts of methanol and 2 parts of tert.-butyl-octyl peroxide was placed in a high pressure reactor. The reactor was closed, cooled, and charged with 110 parts of tetrafluoroethylene through a valve. The reactor was agitated and heated at 170° C. for 10 hours under autogenous pressure (90 atm.). The product was subjected to steam distillation and the volatile fraction was a mixture of liquid and solid which was separated into the two phases. The liquid fraction was subjected to fractional distillation, yielding a series of compounds $$H(CF_2CF_2)_nCH_2OH$$

The solid steam-volatile fraction was recrystallized from chloroform to give 17.5 parts of the compound in which $n$ equals 6 and a second fraction, 5 parts, in which $n$ equals 5. The filtrate from the recrystallization was evaporated and distilled to give 18 parts of a mixture of the compounds in which $n$ equals 4 and 5.

A portion of the reaction product not volatile with steam was subjected to fractional vacuum sublimation, yielding two fractions. After purification by resublimation, these fractions melted at 155–160° C. and 185–190° C., respectively, and were identified as the compounds $$H(CF_2CF_2)_nCH_2OH$$

in which $n$ is 7 and 8.

Still longer chain alcohols were obtained by exhaustive methanol extraction of the remainder of the non-steam-volatile reaction product. This extraction served to remove short chain alcohols, including the alcohol in which $n$ is 8, which is methanol-soluble. The residue from this extraction was a mixture of alcohols which melted over the range 200°–280° C. The highest melting (280° C.) compound in this mixture corresponds, on the basis of the regularities in the melting points of the lower members of the series, to the compound $H(CF_2CF_2)_{12}CH_2OH$. The properties of these compounds are summarized in the following table.

$[H(CF_2CF_2)_nCH_2OH]$

| $n$ | B. P. | M. P. | Per Cent F | |
|---|---|---|---|---|
| | | | Calc. | Found |
| 2 | Degrees 140 | Degrees | 65.4 | 64.1 |
| 3 | 169–170 | | 68.6 | 66.8 |
| 4 | | 65–67 | 70.4 | 70.1 |
| 5 | | 95–97 | 71.4 | 71.6 |
| 6 | | 129–130 | 72.1 | 71.3 |
| 7 | | 155–160 | 72.6 | (1) |
| 8 | | 185–190 | 73.0 | (1) |
| 12 | | 280 | 74.0 | (1) |

[1] Fluorine analyses were not made on these compounds because of the slight differences in fluorine content.

The presence of hydroxyl groups in these compounds was established by absorption bands at $3\mu$ in their infrared spectra. The structures of representative fractions were further confirmed by oxidation to the corresponding acids $$H(CF_2CF_2)_nCO_2H$$

which had the correct neutral equivalents.

Example V

A mixture of 150 parts of ethanol and 5 parts of 1,1'-azobis(1-phenylethane) was charged into a high pressure reactor having a capacity of 400 parts of water by volume. The reactor was closed, cooled, and 110 parts of tetrafluoroethylene was distilled in through a valve. The reactor was then agitated and heated at 175° C. for 8 hours under autogenous pressure. There was obtained 220 parts of clear yellow liquid product. Preliminary distillation of this product to remove the ethanol left a residue of 45 parts which was subjected to careful fractional distillation. There were obtained two principal fractions boiling at 110° and 140° C. These correspond to the compounds $H(CF_2CF_2)_nC_2H_4OH$, in which $n$ is 1 and 2, respectively. The analytical data for these compounds are as follows:

| B. P. | $n$ | Per Cent Fluorine | |
|---|---|---|---|
| | | Calc. | Found |
| Degrees | | | |
| 110 | 1 | 52.0 | 49.2 |
| 143 | 2 | 61.8 | 61.6 |

The presence of hydroxyl groups in these compounds was confirmed by absorption bands at $3\mu$ in their infrared spectra.

Example VI

A mixture of 150 parts of isopropyl alcohol and 5 parts of 1,1'-azobis(1-phenylethane) was charged into a high pressure reactor having a capacity of 400 parts by volume. The reactor was closed, cooled, and 110 parts of tetrafluoroethylene was distilled in through a valve. The reactor was then agitated and heated at 175° C. for a period of 8 hours under autogenous pressure. There was obtained 250 parts of clear liquid which was subjected to steam distillation. There was obtained 87 parts of liquid fraction to which was added an additional 10 parts which was salted out of the aqueous steam distillate with potassium carbonate. This liquid was dissolved in 25 parts of chloroform, dried over potassium carbonate, filtered and distilled. There were obtained three principal fractions boiling at 120°, 150°, and 183° C. These fractions correspond to the compounds $H(CF_2CF_2)_nC_3H_6OH$, in which $n$ is 1, 2 and 3 respectively. The analytical data for these fractions are as follows:

| B. P. | $n$ | Per Cent Fluorine | |
|---|---|---|---|
| | | Calculated | Found |
| Degrees | | | |
| 120 | 1 | 47.5 | 46.8 |
| 150 | 2 | 58.4 | 58.1 |
| 183 | 3 | 63.3 | 63.4 |

The presence of hydroxyl groups in these compounds was confirmed by absorption bands at $3\mu$ in their infrared spectra.

Example VII

A mixture of 100 parts of methanol and 5 parts of alpha,alpha'-azodiisobutyronitrile was placed in a high pressure reactor having a capacity of 400 parts of water by volume under an atmosphere of nitrogen. The reactor was closed, cooled and 100 parts of chlorotrifluoroethylene was distilled in through a valve. The reactor was then agitated and heated at 70° C. for eight hours under autogenous pressure. The product, a liquid weighing 106 parts, was first distilled at atmospheric pressure from a 200° C. bath to give 88 parts of distillate. The residue was then distilled at 110–130° C. at 4 mm. pressure to give 5 parts of a mixture of yellow liquid and solid. This 5-part distillate was dissolved in 50 parts of glacial acetic acid, and 10 parts of potassium permanganate was added slowly to the refluxing solution. After the addition was complete and the resulting sludge had been refluxed several minutes, sulfur dioxide was bubbled in until the solution became clear. After evaporation to dryness on a steam bath at 2 mm. pressure, the residual salt mixture was washed with 25 parts of toluene. The residue was then washed with 20 parts of water. The filtrate was acidified with concentrated sulfuric acid. The acidic two-layer solution was then extracted with two 25-part portions of ether and the ether extracts combined, dried, and distilled to give besides the ether, (a) 1 part of clear liquid boiling at 42° C. at 45 mm. and (b) 0.5 part of yellow oil boiling at 100–130° C. at 3 mm. The neutral equivalents of these acids were:

(a) Anal.: Calc'd for $H(C_2F_3Cl)CO_2H$—
Neutral Equiv.; 162.5
Found—Neutral Equiv.; 145.7
(b) Anal.: Calc'd for $H(C_2F_3Cl)_3CO_2H$—
Neutral Equiv.; 395.5
Found—Neutral Equiv.; 414.7

Fraction b corresponds to the 7-carbon acid $H(C_2F_3Cl)_3CO_2H$ contaminated with a little of the higher acid $H(C_2F_3Cl)_4CO_2H$. The original reaction products of methanol and chlorotrifluoroethylene therefore have the corresponding structure $H(C_2F_3Cl)_nCH_2OH$ where $n$ is 1, 2, 3 and 4.

As hereinbefore stated, this invention comprises heating, at a temperature within the range of from 75° C. to 350° C. in the presence of oxygen, a peroxy catalyst, or an azo catalyst, a completely halogenated fluoroethylene containing at least two fluorine atoms, the remaining halogen atoms, if any, being chlorine atoms, with a primary or secondary alcohol which is free from non-aromatic unsaturation.

Among the completely halogenated fluoroethylenes which are operative in the process of this invention are tetrafluoroethylene, chlorotrifluoroethylene, 1,1-dichloro-2,2-difluoroethylene and 1,2-dichloro-1,2-difluoroethylene. The process is particularly applicable to tetrafluoroethylene which reacts the most readily and is therefore preferred.

While all primary and secondary alcohols which are free of non-aromatic unsaturation, i. e., ethylenic and acetylenic linkages, are operative in my novel process, products having the most desirable properties are produced when the alcohol reacted is a primary or secondary saturated aliphatic alcohol. Primary and secondary alcohols which are operative include acyclic and cyclic, including aliphatic, alicyclic, heterocyclic and aralkyl alcohols. The alcohols may be monohydric, polyhydric or polymeric. Included among examples of such alcohols are aliphatic alcohols, such as methyl alcohol, ethyl alcohol, n-propyl alcohol, isopropyl alcohol, n-butyl alcohol, isobutyl alcohol, secondary butyl alcohol, octyl alcohol, lauryl alcohol and stearyl alcohol; cycloaliphatic alcohols, such as cyclohexyl alcohol and methyl cyclohexyl alcohol; heterocyclic alcohols such as tetrahydrofurfuryl alcohol; aralkyl alcohols, such as benzyl alcohol and phenylethyl alcohol; polyhydric alcohols such as ethylene glycol, propylene glycol, glycerol, hexamethylene glycol, decamethylene glycol, mannitol and sorbitol; polymeric alcohols, such as polyvinyl alcohol. Alcohols containing functional groups in addition to the alcoholic hydroxyl group are also operative. These include the halohydrins, such as ethylene chlorohydrin, ethylene bromohydrin and glycerol chlorohydrin; hydroxyacetic acid and its esters; the monomethyl-, monoethyl- and monobutyl ethers of ethylene glycol and the higher polyethylene glycols and their ethers and esters, such as the monoacetate of ethylene glycol.

Although a mixture of alcohols, as hereinbefore defined, can be reacted with completely halogenated fluoroethylene in accordance with this invention, it is preferable to react a single alcohol therewith. Generally, a relatively large molar excess of the alcohol is used as compared to the fluoroethylene in order to prepare low molecular weight products. However, the desired products may often be obtained by using a relatively small amount of said alcohol depending upon the reaction conditions. Usually the molar ratio of said alcohol to fluoroethylene in the reaction mixture may vary from about 0.04:1 to 20:1, but the desired low molecular weight products are obtained in highest yield when said ratio is within the range of from 1:1 to 10:1.

Organic and inorganic peroxy compounds and oxygen are operative in my invention. Included among examples of said catalysts are: diacyl peroxides, such as benzoyl peroxide and lauroyl peroxide; alkyl peroxides, such as diethyl peroxide and tertiary butyl hydroperoxide; inorganic peroxides, such as hydrogen peroxide; salts of peracids, such as ammonium persulfate, sodium perborate and potassium percarbonate; oxygen; ozone and the like.

Azo catalysts are also operative to produce the fluorine-containing alcohols of my invention. Included among examples of said azo catalysts are: carbamylazoisobutyronitrile, alpha, alpha'-azodiisobutyronitrile, alpha, alpha'-azobis (alpha, gamma-dimethylvaleronitrile), alpha, alpha'-azobis (alpha-phenylpropionitrile), alpha, alpha'-azobis (alpha, gamma-dimethyl-gamma-methoxyvaleronitrile), 1,1'-azodicyclohexanecarbonitrile, alpha, alpha'-azo-diisobutyramide, and dimethyl alpha, alpha'-azodiisobutyrate. These compounds may be prepared by the methods of Thiele and Heuser, Ann. 290, 1–43 (1896), or Hartmann, Rec. trav. chim. 46, 150–153 (1927).

The proportion of catalyst may vary within relatively wide limits depending largely upon the nature of the reactants and the products desired. Highly desirable results are obtained with the use of catalysts corresponding to an amount within the range of from 0.001% to 10% by weight of the reactants employed. Advantageous results are sometimes obtained by using a combination of catalysts.

It will be understood that the operating conditions may vary widely depending upon the nature of the reactants and also upon the result desired. In general, the reaction is effected under substantially anhydrous conditions. The time required for carrying out the reaction may vary from a few minutes to several days depending upon the nature of the reactants and the other operating conditions, such as temperature, pressure and catalyst.

The process may be operated continuously or intermittently. The reaction may be carried out in a closed system or the reaction may be carried out in the vapor phase by mixing the vapors of the alcohol and the fluoroethylene and passing the mixture of vapors through a hot reaction tube which if desired may contain a catalyst. In general, the reaction may be carried out under atmospheric or superatmospheric pressure in the range of 1 to 1000 atmospheres. The preferred pressure range is 1 to 200 atmospheres.

The reaction may be carried out in any suitable reaction vessel, such as stainless steel, iron, silver, aluminum, and other metals and alloys which are capable of withstanding heat and pressure. The reaction is preferably carried out with agitation, but agitation is not always necessary.

While this invention has been illustrated with particular reference to the use of azo catalysts and peroxygen substances as catalysts, it is contemplated that any catalyst may be employed which yields free radicals under the reaction conditions. Particularly useful as catalysts are peroxygen and azo compounds which may be represented as having an open chain structure R—X—X—R where —X—X— is either —O—O— or —N=N— and R is preferably an organic radical.

The present invention is useful for the production of a wide variety of organic fluorine compounds. Although it is understood that often a mixture of compounds with varying ratios of fluoroethylene units per molecule of alcohol is obtained, the mixture can generally be separated into definite fractions by various methods, such as steam distillation, fractional distillation, filtration, extraction, fractional crystallization, or by chemical methods. A high yield of products having a 1:1 ratio of the fluoroethylene to the alcohol frequently can be obtained by using selected conditions.

The products of this invention prepared from tetrafluoroethylene have the general formula H(CF$_2$CF$_2$)$_n$ZOH, wherein $n$ is a positive integer ranging from one to twelve and ZOH is the complementary portion of the alcohol, said alcohol being either primary or secondary and free from non-aromatic unsaturation.

The reaction involved in the preparation of the aforementioned compounds may be illustrated by the following specific equation:

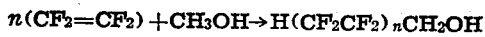

$$n(CF_2=CF_2) + CH_3OH \rightarrow H(CF_2CF_2)_nCH_2OH$$

wherein $n$ is a positive integer within the range of from one to twelve.

In general, the reaction products contain a major proportion of compounds containing from 1 to about 5 fluoroethylene molecules chemically combined with one molecule of the alcohol.

The products can be distinguished readily from the polymerized fluoroethylene by their analysis, by their physical properties and often by their chemical reactions. The products of this invention vary from liquids to relatively low molecular weight solid products which soften or melt below 300° C. when heated in air on a copper block. The liquid products are generally compatible with the common organic solvents and considerable amounts of the solid products are soluble in acetic acid. The presence of the alcoholic hydroxyl in the products of this invention can often be shown by chemical reactions of the products as shown in the examples as well as by their absorption in the infra red.

The reaction and the separation or isolation of the products may be carried out simultaneously or in separate steps. The products may be separated by filtration, extraction, distillation or crystallization depending upon the nature of the products.

The products of this invention are useful for various commercial purposes. Since many of the products of this invention are extremely stable, they are generally applicable for use as solvents, reaction media, lubricants and dielectrics. Many of the products have been found to be very desirable in that they are substantially non-flammable, non-corrosive and non-toxic. Substituted fluorocarbons having outstanding thermal and chemical stability can be prepared according to the present invention. This invention is particularly advantageous in that it affords a safe, flexible, practical and economical method of producing highly fluorinated saturated alcohols. One of the advantages of the invention is that the process may be operated with a relatively small amount of catalyst and the reaction proceeds smoothly and easily.

As many apparently widely different embodiments of this invention may be made without departing from the spirit and scope thereof, it is to be understood that I do not limit myself to the specific embodiments thereof except as defined in the appended claims.

I claim:

1. The process for obtaining fluorine-containing alcohols, which comprises heating at a temperature within the range of from 100° C. to 250° C. a haloethylene having the general formula:

wherein the X substituents are halogen atoms having an atomic weight of less than 40 and at least two of said X substituents are fluorine atoms, with an alcohol which contains a non-aromatic carbon atom bearing a hydroxyl group and a hydrogen atom directly attached thereto and in which all of the non-aromatic carbon atoms are saturated, the mole ratio of said alcohol to said haloethylene being within the range of from 1:1 to 10:1, said heating being effected under a pressure within the range of from one atmosphere to 200 atmospheres and in the presence of an amount of peroxy catalyst within the range of from 0.001% to 10% of the combined weight of said haloethylene and alcohol.

2. The process for obtaining organic fluorine-containing alcohols, which comprises heating at a temperature within the range of from 100° C. to 250° C. a haloethylene having the general formula

wherein the X substituents are halogen atoms having an atomic weight of less than 40 and at least two of said X substituents are fluorine atoms, with a saturated aliphatic alcohol in which a carbon atom bearing a hydroxyl group has a hydrogen atom directly attached thereto, the mole ratio of said alcohol to said haloethylene being within the range of from 1:1 to 10:1, said heating being effected under a pressure within the range of from one atmosphere to 200 atmospheres and in the presence of an amount of peroxy catalyst within the range of from 0.001% to 10% of the combined weight of said haloethylene and alcohol.

3. The process for obtaining organic fluorine-containing alcohols, which comprises heating at a temperature within the range of from 100° C. to 250° C. tetrafluoroethylene with a saturated monohydric aliphatic alcohol which contains from one to six carbon atoms and in which the carbon atom bearing the hydroxyl group has at least one hydrogen atom directly attached thereto, the mole ratio of said alcohol to said tetrafluoroethylene being within the range of from 1:1 to 10:1, said heating being effected under a pressure within the range of from one atmosphere to 200 atmospheres and in the presence of an amount of peroxy catalyst within the range of from 0.001% to 10% of the combined weight of said tetrafluoroethylene and alcohol.

4. The process for obtaining organic fluorine-containing alcohols which comprises heating tetrafluoroethylene with methanol at a temperature within the range of from 100° C. to 250° C., the mole ratio of said methanol to said tetrafluoroethylene being within the range of from 1:1 to 10:1, said heating being effected under a pressure within the range of from one atmosphere to 200 atmospheres in the presence of an amount of diethyl peroxide within the range of from 0.001% to 10% of the combined weight of said tetrafluoroethylene and methanol.

5. The process for obtaining organic fluorine-containing alcohols which comprises heating tetrafluoroethylene with isopropanol at a temperature within the range of from 100° C. to 250° C., the mole ratio of said isopropanol to said tetrafluoroethylene being within the range of from 1:1 to 10:1, said heating being effected under a pressure within the range of from one atmosphere to 200 atmospheres in the presence of an amount of benzoyl peroxide within the range of from 0.001% to 10% of the combined weight of said tetrafluoroethylene and isopropanol.

6. A saturated fluorine-containing alcohol melting below 300° C. and having the formula $H(CX_2CX_2)_nROH$ where $n$ is a positive integer from 1 to 12, the X substituents are halogen atoms having an atomic weight of less than 40 of which at least half in each $CX_2CX_2$ group are fluorine atoms, R is a divalent hydrocarbon radical and ROH is a monovalent radical of a nontertiary alcohol which contains a non-aromatic carbon atom bearing the alcoholic hydroxyl group and in which all of the non-aromatic carbon atoms are saturated.

7. A saturated fluorine-containing alcohol melting below 300° C. and having the formula $H(CX_2CX_2)_nROH$ where $n$ is a positive integer from 1 to 12, the X substituents are halogen atoms having an atomic weight of less than 40 of which at least half in each $CX_2CX_2$ group are fluorine atoms, R is a divalent saturated aliphatic hydrocarbon radical and ROH is a monovalent radical of a saturated aliphatic non-tertiary alcohol.

8. A saturated fluorine-containing alcohol melting below 300° C. and having the formula $H(CF_2CF_2)_nROH$ where $n$ is a positive integer from 1 to 12, R is a divalent saturated aliphatic hydrocarbon radical and ROH is a monovalent radical of a saturated aliphatic non-tertiary alcohol.

9. A saturated fluorine-containing alcohol melting below 300° C. and having the formula $H(CF_2CF_2)_nROH$ where $n$ is a positive integer from 1 to 12, R is a divalent saturated open-chain aliphatic radical and —ROH is a monovalent radical of a saturated open-chain aliphatic primary alcohol.

10. A saturated fluorine-containing alcohol melting below 300° C. and having the formula $H(CF_2CF_2)_nROH$ where $n$ is a positive integer from 1 to 12, R is a divalent hydrocarbon radical and ROH is a monovalent radical of a non-tertiary alcohol which contains a non-aromatic carbon atom bearing the hydroxyl group and in which all of the non-aromatic carbon atoms are saturated.

11. A saturated fluorine-containing alcohol melting below 300° C. and having the formula $H(CF_2CF_2)_nROH$ where $n$ is a positive integer from 1 to 12 and R is a divalent saturated open-chain aliphatic hydrocarbon radical containing from 1 to 6 carbon atoms and ROH is a monovalent radical of a saturated open-chain aliphatic non-tertiary alcohol.

12. A saturated fluorine-containing alcohol melting below 300° C. and having the formula $H(CF_2CF_2)_nCH_2OH$ where $n$ is a positive integer from 1 to 12.

13. A saturated fluorine-containing alcohol melting below 300° C. and having the formula $H(CF_2CF_2)_nC_2H_4OH$ where $n$ is a positive integer from 1 to 12.

14. A saturated fluorine-containing alcohol melting below 300° C. and having the formula $H(CF_2CF_2)_nC_3H_6OH$ where $n$ is a positive integer from 1 to 12.

ROBERT M. JOYCE, Jr.

REFERENCES CITED

The following references are of record in the file of this patent:

UNITED STATES PATENTS

| Number | Name | Date |
| --- | --- | --- |
| 2,230,654 | Plunkett | Feb. 4, 1941 |
| 2,411,159 | Hanford | Nov. 19, 1946 |

OTHER REFERENCES

Compt. Rend. Acad. Sci. URSS., vol 55, pages 223–6 (1947) (Knunyants) Abstracted in Chemical Abstracts, vol. 41, (1947), page 5855d.